United States Patent
Hwang (10) Patent No.: US 10,990,521 B1
(45) Date of Patent: Apr. 27, 2021

(54) DATA STORAGE SYSTEM, DATA STORAGE DEVICE AND MANAGEMENT METHOD THEREOF

(71) Applicant: ASMedia Technology Inc., New Taipei (TW)

(72) Inventor: Wei-Kan Hwang, New Taipei (TW)

(73) Assignee: ASMedia Technology Inc., New Taipei (TW)

( * ) Notice: Subject to any disclaimer, the term of this patent is extended or adjusted under 35 U.S.C. 154(b) by 0 days.

(21) Appl. No.: 16/792,857

(22) Filed: Feb. 17, 2020

(30) Foreign Application Priority Data

Jan. 10, 2020 (TW) .................................. 109100918

(51) Int. Cl.
- G06F 12/02 (2006.01)
- G06F 12/0873 (2016.01)
- G06F 12/0831 (2016.01)
- G06F 11/30 (2006.01)

(52) U.S. Cl.
CPC ...... *G06F 12/0292* (2013.01); *G06F 11/3037* (2013.01); *G06F 12/0215* (2013.01); *G06F 12/0246* (2013.01); *G06F 12/0835* (2013.01); *G06F 12/0873* (2013.01); *G06F 2212/7201* (2013.01)

(58) Field of Classification Search
CPC ............. G06F 12/0292; G06F 11/3037; G06F 12/0246; G06F 12/0835; G06F 12/0873; G06F 2212/7201; G06F 12/0215
See application file for complete search history.

(56) References Cited

U.S. PATENT DOCUMENTS

| | | | | |
|---|---|---|---|---|
| 2011/0013693 A1* | 1/2011 | Shimizu | ............... | H04N 19/137 375/240.05 |
| 2014/0328204 A1* | 11/2014 | Klotsche | ................. | H04L 45/54 370/252 |
| 2014/0365719 A1 | 12/2014 | Kuzmin et al. | | |
| 2017/0090802 A1* | 3/2017 | Margetts | ............... | G06F 3/0625 |

FOREIGN PATENT DOCUMENTS

| | | |
|---|---|---|
| CN | 104375956 | 11/2017 |
| TW | I379197 | 12/2012 |
| TW | I638359 | 10/2018 |
| TW | 201908975 | 3/2019 |

OTHER PUBLICATIONS

Wei-Kan Hwang et al., "Data Storage Apparatus and Data Prediction Method Thereof", Unpublished U.S. Appl. No. 16/441,032, filed Jun. 14, 2019.

* cited by examiner

*Primary Examiner* — Sean D Rossiter
(74) *Attorney, Agent, or Firm* — JCIPRNET (57) ABSTRACT

A management method for a data storage device is provided and includes the following steps: obtaining a plurality of association rules according to a plurality of previous access commands; building a plurality of look-up tables according to the association rules; receiving a current access command and determining whether the current access command corresponds to at least one of the look-up tables to obtain physical addresses of the current access command from the corresponding look-up table; predicting a look-up table corresponding to a subsequent access command based on these association rules; and pre-establishing the predicted look-up tables. The invention also provides a data storage system and a data storage device, which can implement the management method described above.

22 Claims, 6 Drawing Sheets

DATA STORAGE SYSTEM, DATA STORAGE DEVICE AND MANAGEMENT METHOD THEREOF

CROSS-REFERENCE TO RELATED APPLICATION

This application claims the priority benefit of Taiwan application serial no. 109100918, filed on Jan. 10, 2020. The entirety of the above-mentioned patent application is hereby incorporated by reference here and made a part of this specification.

BACKGROUND

Field of the Disclosure

The present disclosure relates to a data access technology, and more particularly, to a data storage system, a data storage device and a management method thereof.

Description of Related Art

In recent years, various electronic devices equipped with storage devices have been widely used by consumers in daily life. As the demand for storage capacity increases, fast nonvolatile memory with large capacity that can be read and written has become very popular, and most of such products adopt flash memory to store data.

Due to the read and write characteristics of flash memory, flash memory has a logical-physical address look-up table, which is used to record the mapping relationship between the logical block address (LBA) and physical block address (PBA). Only by finding the actual block address of the logical address of access command in the flash memory through look-up table, the data can be correctly accessed. However, due to the limitation of storage capacity and cost, it is impossible to record all the mapping relationships between PBA and LBA. If the target of the access command is not within the range recorded by the look-up table, the system needs to remove the existing look-up table and re-establish a look-up table according to the access address of the target, which reduces the access efficiency of the flash memory.

SUMMARY OF THE DISCLOSURE

The present disclosure provides a data storage system, a data storage device and a management method thereof, which can reduce the number of times for re-establishing the logical-physical address look-up table required for the data storage device, and increase the hit rates of the logical-physical address look-up table required for the data storage device, thereby enhancing the performance of the data storage device.

An embodiment of the present disclosure provides a data storage device, including a memory array, a prediction unit, and a look-up table management unit. The prediction unit is configured to obtain a plurality of association rules between a plurality of access locations after performing association rules analysis based on a plurality of previous access commands. The look-up table management unit is configured to manage a plurality of look-up tables according to the association rules, wherein the look-up table management unit determines whether the current access command corresponds to at least one of the look-up tables to obtain the physical address of the current access command in the memory array from the corresponding look-up table. If there is no corresponding look-up table, it is necessary to establish a corresponding look-up table, and predict the look-up table corresponding to subsequent access commands and pre-establish these look-up tables according to these association rules.

An embodiment of the present disclosure provides a data storage system including a host and a data storage device. The host includes a computing device, wherein the computing device obtains a plurality of association rules after performing association rules analysis according to a plurality of previous access commands. The data storage device is electrically connected to the host and includes an input-output interface, a memory array and a look-up table management unit. The data storage device receives the association rules and the current access command from the host through the input-output interface. The look-up table management unit is configured to manage the plurality of look-up tables according to the association rules, wherein the look-up table management unit determines whether the current access command corresponds to at least one of the look-up tables to obtain the physical address of the current access command in the memory array from the corresponding look-up table. If there is no corresponding look-up table, it is necessary to establish a corresponding look-up table, and predict the look-up table corresponding to subsequent access commands and pre-establish the look-up tables according to the association rules.

An embodiment of the present disclosure provides a management method for data storage device, including the following steps: obtaining a plurality of association rules according to a plurality of previous access commands; establishing a plurality of look-up tables according to the association rules; receiving a current access command, and determining whether the current access command corresponds to at least one of the look-up tables to obtain the physical address of the current access command from the corresponding look-up table; if there is no corresponding look-up table, it is necessary to establish a corresponding look-up table, and predict the look-up table corresponding to subsequent access commands and pre-establish the look-up tables according to the association rules.

Based on the above, the present disclosure provides a data storage system, a data storage device and a management method thereof, by analyzing the access history of the data storage device to obtain association rules between previous access locations, and establishing a look-up table according to the association rules and even further predicting the subsequent possible access locations according to the association rules and prepare the look-up table correspondingly, in this manner, the corresponding hit rate of the look-up table can be improved, the number of times of re-establishing look-up tables can be reduced, thereby enhancing the performance of data accessing.

DESCRIPTION OF EMBODIMENTS

In order to make the content of the present disclosure to be more comprehensible, the following specific embodiments serve as examples of the present disclosure that can be actually implemented. In addition, wherever possible, the same reference numerals/components/steps are used in the drawings and embodiments to represent the same or similar parts.

Figure 1:
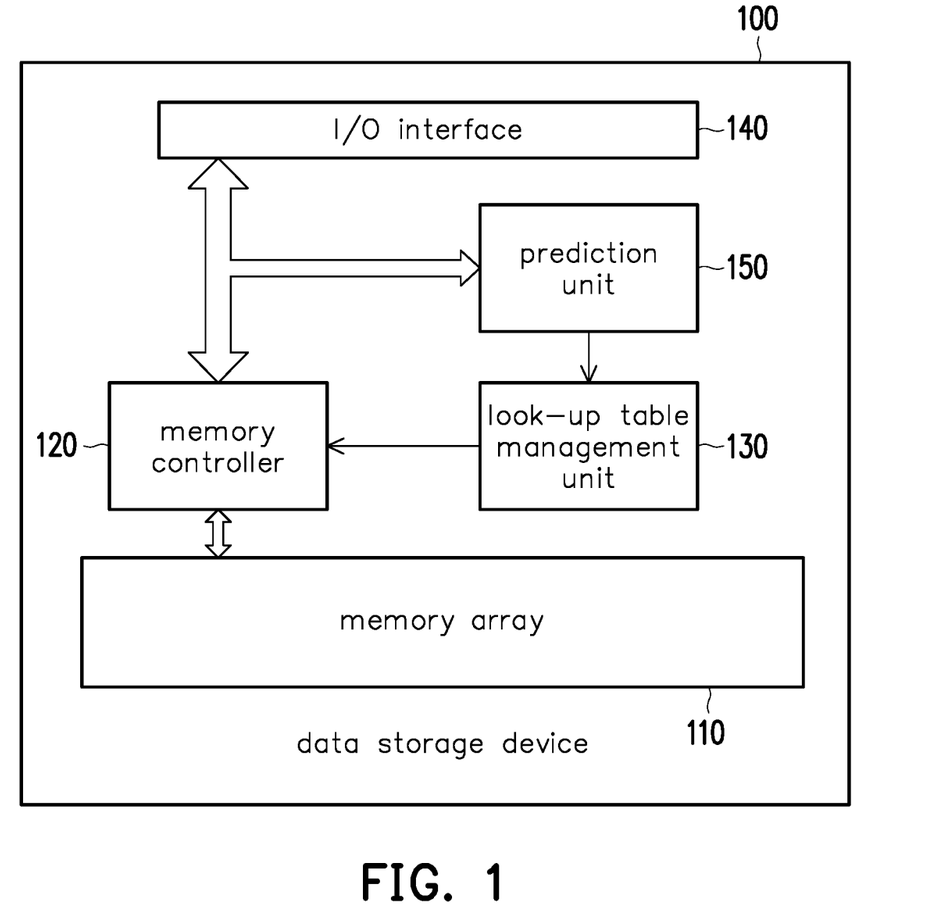
FIG. 1 is a functional block diagram of a data storage device according to an embodiment of the present disclosure.

FIG. 1 is a functional block diagram of a data storage device according to an embodiment of the present disclosure. In this embodiment, the data storage device 100 may be a NAND flash memory, but is not limited thereto. The data storage device 100 includes a memory array 110, a memory controller 120, a look-up table management unit 130, an input-output (I/O) interface 140, and a prediction unit 150. The memory array 110 includes a plurality of memory cells arranged in a matrix. The memory controller 120 performs data access operations on the memory array 110 based on the access command from the I/O interface 140. The I/O interface 140 supports interface protocols such as SATA, USB, PCIe, or SPI. The look-up table management unit 130 is configured to manage a plurality of look-up tables (LUTs). The look-up tables are stored, for example, in a spare area of the memory array 110 or a cache. Through the look-up tables, the look-up table management unit 130 converts the logical address of the access target into the physical address of the memory array 110. Specifically, the look-up table management unit 130 includes a Flash Translation Layer (FTL), which can convert a logical block address (LBA) into a physical block address (PBA). The memory controller 120 moves data into or out of the selected memory cell according to the physical address provided by the look-up table management unit 130.

It is worth noting that the prediction unit 150 of this embodiment can analyze the access history of the data storage device 100. The prediction unit 150 collects a plurality of access commands (hereinafter referred to as previous access commands) in the access history, and obtains a plurality of association rules according to the previous access commands. The above-mentioned association rules reflect positional associations between access targets. More specifically, the prediction unit 150 performs quantization processing on the previous access commands to obtain a plurality of quantization data, and performs association rules analysis on the quantization data to obtain the association rules. The look-up table management unit 130 manages the look-up tables according to the association rules provided by the prediction unit 150. The look-up table management unit 130 determines whether the current access command corresponds to at least one of the existing look-up tables to obtain the physical address of the current access command in the memory array 110 from the corresponding look-up table, and predicts the look-up table corresponding to future received access command (referred to as subsequent access command) according to the corresponding association rule. When none of the existing look-up tables corresponds to the current access command, the look-up table management unit 130 establishes a look-up table corresponding to the current access command, and pre-establishes a look-up table that is predicted to be corresponding to a subsequent access command according to the association rule.

In this embodiment, the prediction unit 150 and the look-up table management unit 130 may be implemented in the form of hardware and/or software, which is not limited in the present disclosure. In an embodiment, the prediction unit 150 or the look-up table management unit 130 may be pre-stored in the data storage device 100 in the form of firmware, middleware, or application (APP), and executed by the memory controller 120 or the processor.

A number of embodiments will be given below to specifically describe the implementation details of the data storage device 100.

Figure 2:
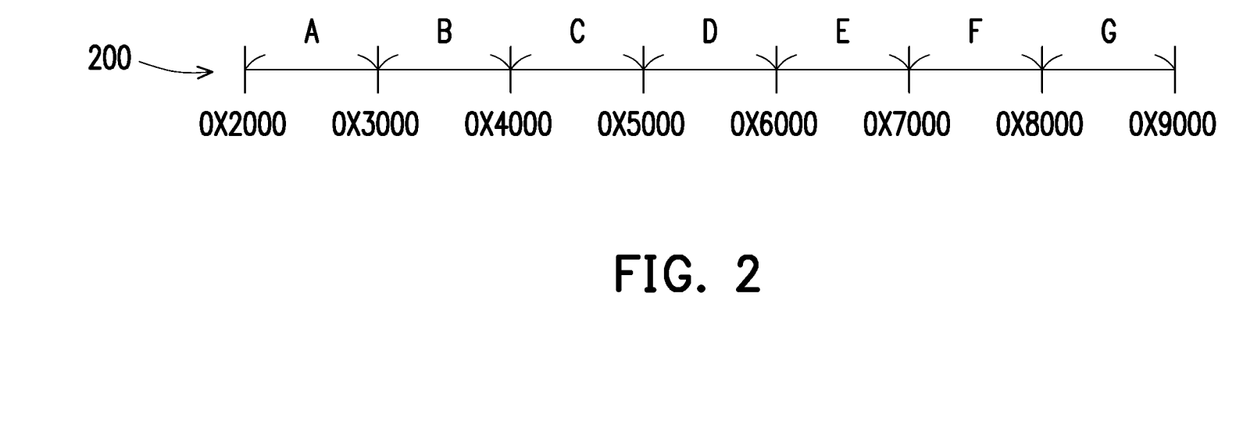
FIG. 2 is a schematic diagram of a segmentation manner of a logical address of a data storage device according to an embodiment of the present disclosure.
Figure 3:
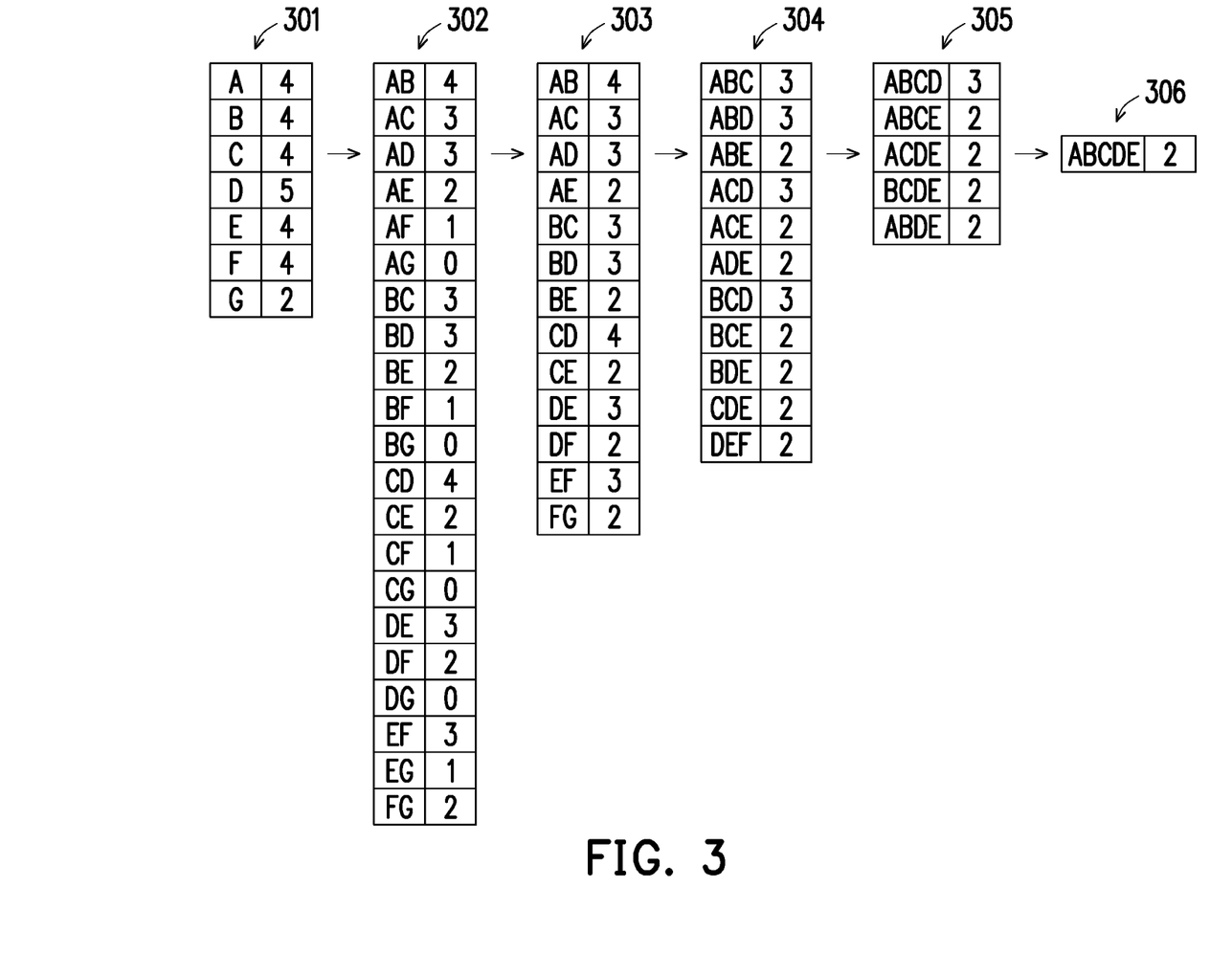
FIG. 3 is a schematic diagram showing an association rules analysis process according to an embodiment of the present disclosure.

FIG. 2 is a schematic diagram of a segmentation manner of a logical address of a data storage device according to an embodiment of the present disclosure, and FIG. 3 is a schematic diagram showing an association rules analysis process according to an embodiment of the present disclosure. Please refer to FIG. 2. The logical address range 200 presents the data storage space of the memory array 110 in a linear manner. The logical address range 200 of the memory array 110 is marked and divided into multiple segments after quantization processing, as section A to section G shown in FIG. 2. In detail, the section A includes a range of logical addresses 0x2000 to 0x2999 in a logical address range 200. Section B includes a range of logical addresses 0x3000 to 0x3999. Section C includes a range of logical addresses 0x4000 to 0x4999. Section D includes the range of logical addresses 0x5000 to 0x5999. Section E includes a range of logical addresses 0x6000 to 0x6999. Section F includes the range of logical addresses 0x7000 to 0x7999. Section G includes the range of logical addresses 0x8000 to 0x8999.

The present disclosure provides no limitation to the size of the storage space of the memory array 110, the number of segments, and the logical address range included in each segment. In addition, in this embodiment, the data storage space of the memory array 110 is equally divided into a plurality of segments A to G, that is, the lengths of logical address ranges of each segment in the segments A to G are the same, but in other embodiments, after the data storage space of the memory array 110 is quantized, the data storage space is marked as a plurality of segments, and the lengths of the address ranges of the segments may be different.

Each access command received by the data storage device 100 includes the initial logical block address of the access target and a sector length. Therefore, the prediction unit 150 can correspondingly convert the access command according to the segments A to G subjected to quantization processing, thereby converting the location of the access target into a corresponding segment. This embodiment uses eight previous access commands cmd1 to cmd8 as an example. The following Table 1 records the initial logical block address, sector length, and corresponding segment items of the previous access commands cmd1 to cmd8. For example, the address range of the access target of the previous access command cmd1 is from 0X2900 to 0X3000, corresponding to the segment A and segment B; the address range of the access target of the previous access command cmd2 is from 0X5200 to 0X7200, corresponding to segment D, segment E and segment F simultaneously, and so on, and the segment items corresponding to the rest of previous access commands cmd3 to cmd8 are not be described in detail.

TABLE 1

| previous access command | initial LBA | sector length | segment item |
|---|---|---|---|
| cmd1 | 0X2900 | 0X0100 | AB |
| cmd2 | 0X5200 | 0X2000 | DEF |
| cmd3 | 0X7500 | 0X1000 | FG |
| cmd4 | 0X2500 | 0X3000 | ABCD |
| cmd5 | 0X2500 | 0X5000 | ABCDEF |
| cmd6 | 0X6100 | 0X2000 | EFG |
| cmd7 | 0X2500 | 0X4000 | ABCDE |
| cmd8 | 0X4150 | 0X1000 | CD |

The prediction unit 150 counts the access counts of the previous access commands cmd1 to cmd8 on the segments A to G, and performs association rules analysis based on the access counts on the segments A to G. Please refer to FIG. 3. The quantization data 301 in FIG. 3 records the access counts of the previous access commands cmd1 to cmd8 on the segments A to G. As can be seen from Table 1, the access ranges of the previous access commands cmd1, cmd4, cmd5, and cmd7 all involved segment A and segment B, and the access counts on segment A and segment B were 4; the access ranges of the previous access commands cmd4, cmd5, cmd7, and cmd8 all involved segment C, and the access counts on segment C were 4; the access ranges of the previous access commands cmd2, cmd4, cmd5, cmd7, and cmd8 all involved segment D, and the access counts on segment D were 5; the access ranges of the previous access commands cmd2, cmd5, cmd6, and cmd7 all involved segment E, and the access counts on segment E were 4; the access ranges of the previous access commands cmd2, cmd3, cmd5 and cmd6 all involved segment F, and the access counts on segment F were 4; the access ranges of the previous access commands cmd3 and cmd6 both involved segment G, and the access counts on segment G were 2. Here, the access counts on each segment represents the support level in the association rules analysis. In other words, the quantization data 301 records the support level of the previous access commands cmd1 to cmd8 for each segment, respectively. The prediction unit 150 may select useful quantization data according to the minimum support threshold. In this embodiment, the minimum support threshold is set to 2. If the quantization data 301 has a segment with a support level that is less than the minimum support threshold, the quantization data of the segment will be considered irrelevant and eliminated. On the other hand, the quantization data with the support level that is not less than the minimum support threshold will be retained. The quantization data 301 is fully retained.

Next, the prediction unit 150 analogizes the quantization data 302. The quantization data 302 records the support level of a combination of any two segments. For example, the access ranges of the previous access commands cmd1, cmd4, cmd5, and cmd7 involve both segment A and segment B, and the support level of segment item AB is 4; the access ranges of the previous access commands cmd5 and cmd7 involve both segment A and segment E, and the support level of segment item AE is 2; none of the previous access commands involves both segment A and segment G, so the support level of segment item AG is 0. By analogy, the analysis on the rest of segment combinations will not be described in detail here.

Then, because the quantization data 302 has some segment items with a support level less than 2, the prediction unit 150 deletes the unqualified quantization data in order to retain the quantization data 303 with a certain association.

Next, the prediction unit 150 analogizes the quantization data 304. The quantization data 304 records the support level of a combination of any three segments. For example, the access ranges of the previous access commands cmd4, cmd5, and cmd7 involve segment A, segment B, and segment C, and the support level of segment item ABC is 3; the access ranges of the previous access commands cmd5 and cmd7 involve segment A, segment B and segment E, and the support level of the segment item ABE is 2, and so on.

Then, the prediction unit 150 analogizes the quantization data 305. The quantization data 305 records the support level of a combination of any four segments. For example, the access ranges of the previous access commands cmd4, cmd5, and cmd7 involve segment A, segment B, segment C, and segment D, and the support level of the segment item ABCD is 3; the access ranges of the previous access commands cmd5 and cmd7 involve segment A, segment B, segment C, and segment E, and the support level of the segment item ABCE is 2, and so on.

The prediction unit 150 continues to generate quantization data 306. The quantization data 305 records the support level of a combination of any five segments. At this point, the quantization data 306 only includes a segment item ABCDE with a support level of 2. The prediction unit 150 will infer the support level of all combinations of segments.

The prediction unit 150 further calculates the confidence level between each segment or each combination of segments, and determines one or more association rules according to the minimum confidence threshold, so that the look-up table management unit 130 can predict the look-up table corresponding to a subsequent access command according to the above-mentioned association rule. The confidence level is the ratio of the support level between each segment or combinations of segments. When the confidence level is greater than or equal to the minimum confidence threshold, the association rule will be established.

Please refer to the plurality of quantization data 301 to 306 in FIG. 3 above. Here, the minimum confidence threshold is set to 0.75. Here are a few examples for illustration. Take segment combination ABCD and segment D as an example, the confidence level between the two is 1, which is greater than the minimum confidence threshold; therefore, and then the prediction unit 150 establishes an association rule between the segment combination ABC and the segment D. In other words, when the access range of the access command (also referred to as the current access command) currently received by the data storage device 100 involves segment A, segment B, and segment C, the prediction unit 150 predicts that the next possible access range will fall within the segment D. Take the association between segment A and segment combination ABCD as an example, the confidence level is 0.75, which exactly passes the minimum confidence threshold, and then the prediction unit 150 establishes an association rule between the segment A and segment combination ABC. If the access range of the current access command falls within segment A, the prediction unit 150 predicts that the next possible access range will involve segment A, segment B and segment C. Take the association between segment B and segment combination BCDE as an example, the confidence level is 0.5, which does not exceed the minimum confidence threshold, then the prediction unit 150 will not establish the association rule between the segment B and the segment combination CDE. If the access range of the current access command falls within the segment B, then the prediction unit 150 predicts that the next possible access range will not involve the three segments C, D and E simultaneously.

The look-up table management unit 130 establishes a plurality of look-up tables that are associated with the current access command according to the association rules provided by the prediction unit 150. Specifically, the mapping range of each look-up table may be equal to the logical address range of at least one segment. In this embodiment, the mapping range of each look-up table is equal to the logical address range of one of the segments A to G. In another embodiment, the mapping range of the look-up table may also include a logical address range of a plurality of segments. The disclosure provides no limitation to the mapping range of the look-up table.

Take the access target of the current access command as an example, the look-up table management unit 130 determines whether the current access command hits an existing look-up table. If it hits, the look-up table management unit 130 provides the physical address of the current access command to the memory controller 120, and predicts that the location of the next possible access target will fall within the range of 0x2000 to 0x4999 (segment A to segment C) according to the association rule of the segment A. The look-up table management unit 130 further prepares a look-up table mapping this access range. The look-up table management unit 130 may further predict the next possible access locations according to the association rule of the segment BCD or other association rules of the segment A, and prepare a look-up table, and so on. In short, the look-up table management unit 130 sequentially prepares look-up tables that have an association or indirect association with the segment A, and therefore these look-up tables have an association rule relationship with one another.

If the current access command misses the existing look-up table, the look-up table management unit 130 will establish a look-up table that can correspond to the current access command, and will re-establish a plurality of look-up tables that are associated with the current access command according to the association rule, and the newly established multiple look-up tables will include look-up tables that are predicted to be used next. In short, when the current access command does not correspond to any of the existing multiple look-up tables, the look-up table management unit 130 will establish a look-up table corresponding to the current access command and pre-establish a look-up table that is predicted to be corresponding to the subsequent access command according to the association rule.

In this embodiment, when the storage space of the look-up table is insufficient, the look-up table management unit 130 preferentially removes the look-up table corresponding to the minimum support level or the look-up table with the lowest association with the current access command according to the association rule. In an embodiment, the support level of the segment G is the smallest, or the access range of the current access command involves both the segment B and the segment C, and the association between the segment G and the combined segment BC is the lowest (even irrelevant), the look-up table management unit 130 chooses to remove the look-up table corresponding to the segment G.

In this embodiment, the prediction unit 150 obtains association rules between access locations by analyzing multiple previous access commands of the access history, and the look-up table management unit 130 manages the look-up table according to the association rule, and even prepares a look-up table that corresponds to future possible access locations to improve access efficiency of the data storage device 100. Furthermore, this embodiment also reduces the computational burden of association rules analysis by means of quantization processing.

Figure 4:
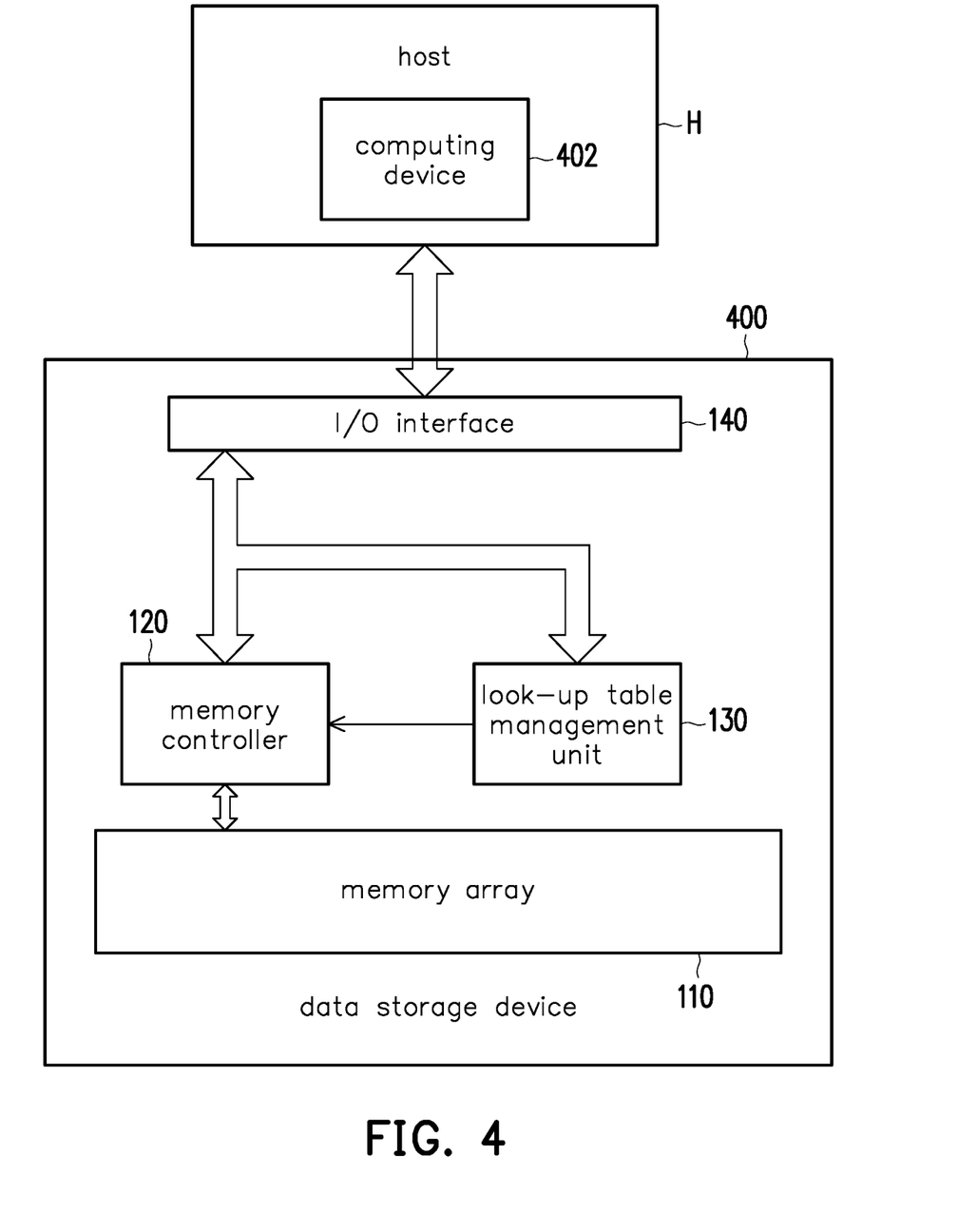
FIG. 4 is a functional block diagram of a data storage system according to another embodiment of the present disclosure.

FIG. 4 is a functional block diagram of a data storage system according to another embodiment of the present disclosure. The data storage system 40 includes a host H and a data storage device 400. The data storage device 400 may be a NAND flash memory, but is not limited thereto. The data storage device 400 is similar to the data storage device 100, but may not include the prediction unit 150. The data storage device 400 is electrically connected to the host H through the I/O interface 140, wherein the host H includes a computing device 402.

The host H sends an access command to the data storage device 400 to write or read data, and records the previously sent access commands. The computing device 402 can perform the action like that performed by the prediction unit 150 of the data storage device 100, obtaining a plurality of association rules according to a plurality of previous access commands. The computing device 402 may be a central processing unit (CPU), a microprocessor, a digital signal processor (DSP), a programmable controller, an application specific integrated circuit (ASIC), a programmable logic device (PLD) or other similar devices or a combination of these devices, which performs association rules analysis by executing firmware or software.

The data storage device 400 receives the association rules and the current access command from the host H through the I/O interface 140. The look-up table management unit 130 manages the plurality of look-up tables according to the received association rules. The look-up table management unit 130 can determine whether the current access command corresponds to at least one of the existing look-up tables to obtain the physical address of the current access command in the memory array 110 from the corresponding look-up table, and predict the look-up table corresponding to the subsequent access command according to the association rule. For details about how the computing device 402 obtains the association rules between access locations and how the look-up table management unit 130 manages the look-up table, please refer to the description of the above embodiment, and no further descriptions will be incorporated here.

In this embodiment, the execution of the association rules analysis is performed by the computing device 402 of the host H. In this way, the requirement for the data storage device 400 to perform computing operation can be reduced. By receiving the association rules from the host H, the data storage device 400 still has the effect of predicting a look-up table that may be used in the future and improving the access hit rate.

Figure 5:
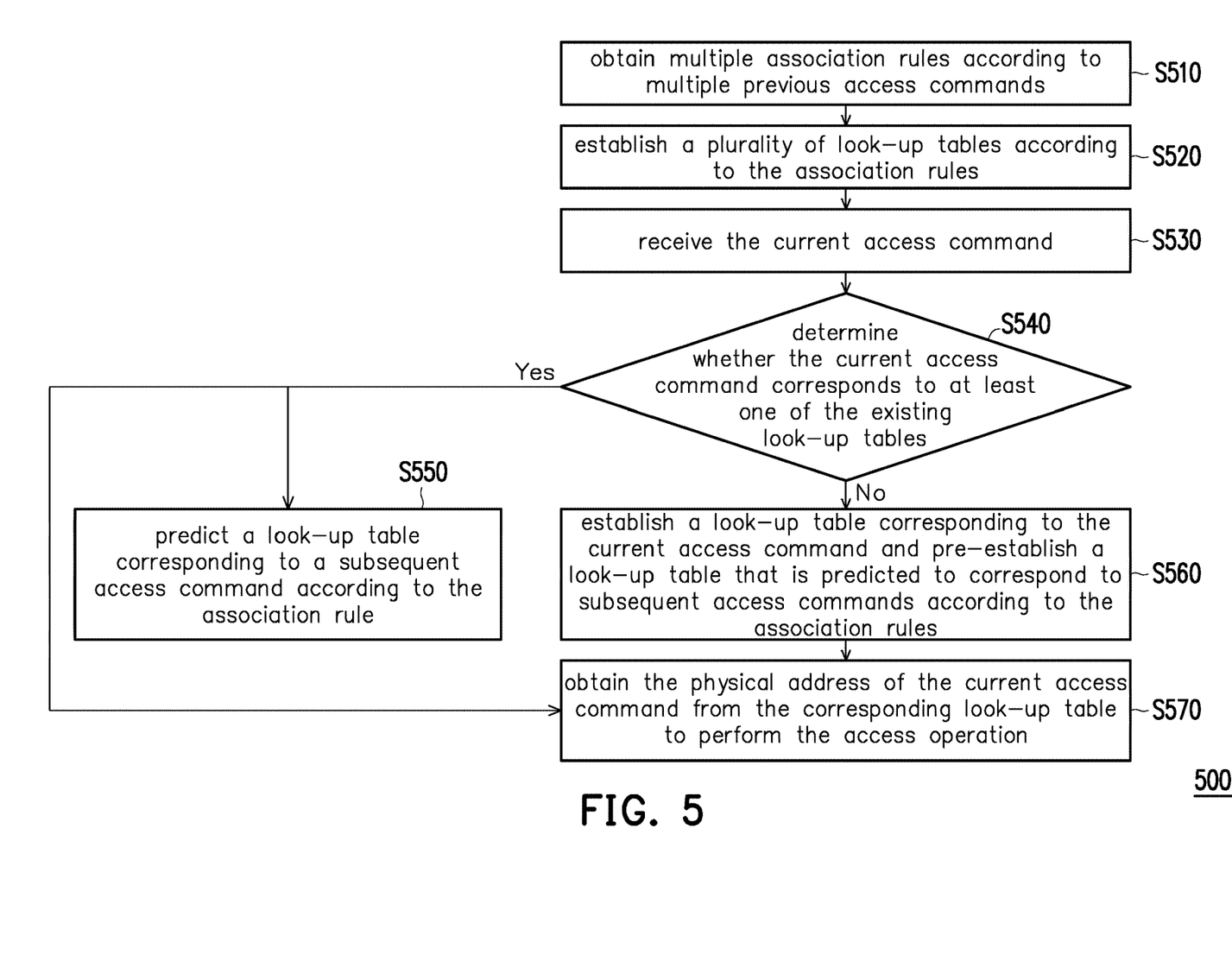
FIG. 5 is a flowchart of a management method of a data storage device according to an embodiment of the present disclosure.

FIG. 5 is a flowchart of a management method of a data storage device according to an embodiment of the present disclosure. The management method 500 is adaptable for the data storage device 100 and the data storage system 40 described above. The following describes the steps of the management method 500 with reference to the reference symbols used in the above embodiments.

In step S510, the prediction unit 150 or the computing device 402 is used to obtain multiple association rules according to multiple previous access commands. The association rules are provided to the look-up table management unit 130. Then, in step S520, a plurality of look-up tables are established by the look-up table management unit 130 according to the association rules. Thereafter, in step S530, the data storage device 100 or the data storage device 400 receives the current access command. In step S540, the look-up table management unit 130 determines whether the current access command corresponds to at least one of the existing look-up tables. If the current access command hits an existing look-up table, step S550 is performed, and the look-up table management unit 130 predicts a look-up table corresponding to a subsequent access command according to the association rule. In addition, step S570 is performed, the look-up table management unit 130 obtains the physical address of the current access command from the corresponding look-up table, and the memory controller 120 performs an access operation according to the physical address of the current access command. If the current access command misses the existing look-up table, step S560 is performed to establish a look-up table corresponding to the current access command, and pre-establish a look-up table that is predicted to correspond to subsequent access commands according to the association rules. Next, step S570 is performed again, the look-up table management unit 130 obtains the physical address of the current access command from the newly established look-up table, and the memory controller 120 performs an access operation according to the physical address of the current access command.

Sufficient suggestions, teachings or descriptions of the implementation details of the management method 500 can be obtained from the embodiments of FIG. 1 to FIG. 4, and no further descriptions will be incorporated here.

Figure 6:
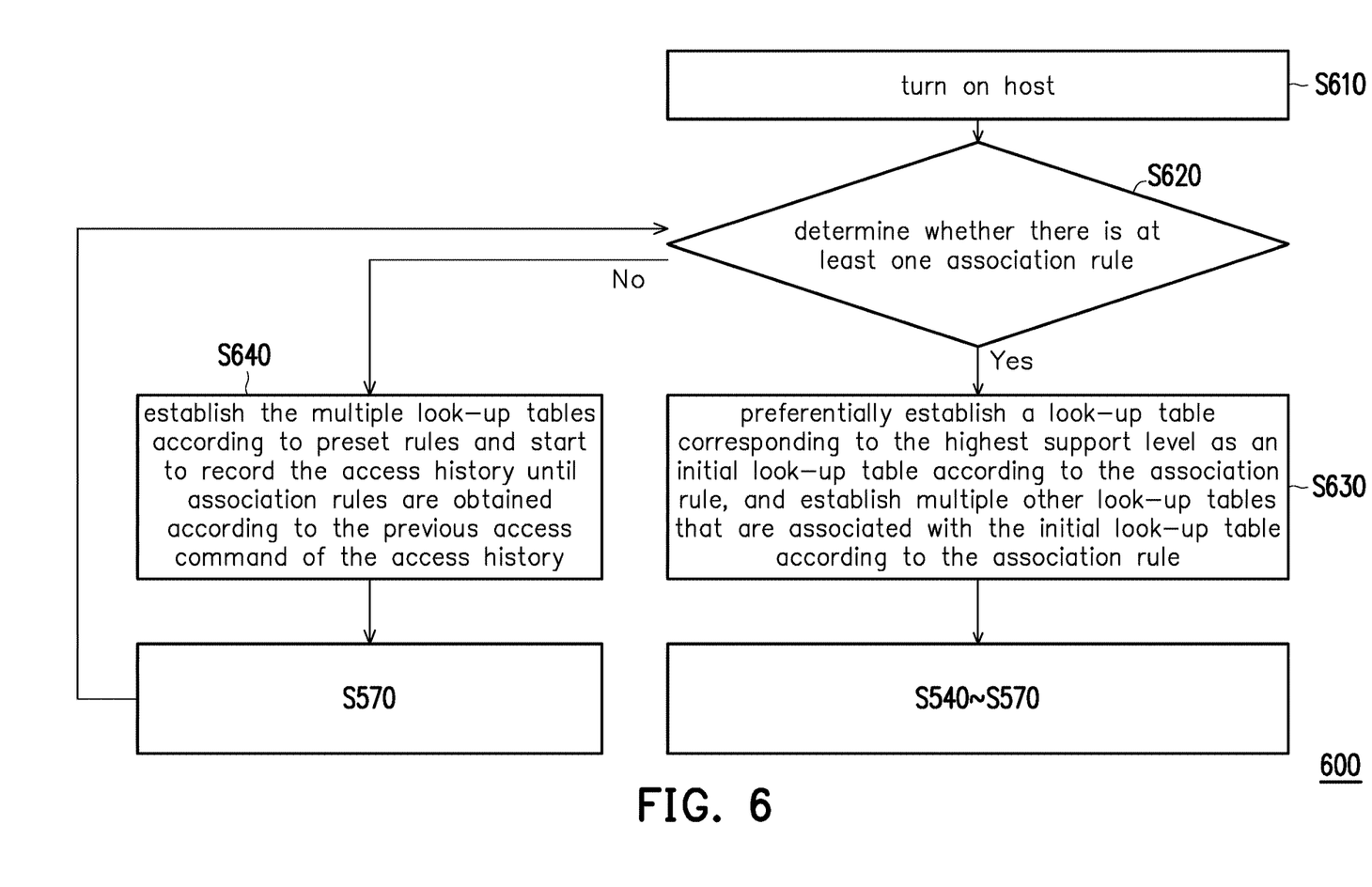
FIG. 6 is a flowchart of a management method of a data storage device according to another embodiment of the present disclosure.

FIG. 6 is a flowchart of a management method of a data storage device according to another embodiment of the present disclosure. The management method 600 is adaptable for the data storage device 100 and the data storage system 40 described above. The following describes the steps of the management method 600 with reference to the reference symbols used in the above embodiments.

The data storage device 100 or the data storage device 400 is installed on an electronic device, and the host H in FIG. 4 is taken as an example. In step S610, the host H is turned on. In step S620, it is determined whether there is at least one association rule. When at least one association rule has been stored in the host H or the data storage device 100 or 400, step S630 is performed, and the look-up table management unit 130 preferentially establishes a look-up table corresponding to the highest support level as an initial look-up table according to the association rule, and establishes multiple other look-up tables that are associated with the initial look-up table according to the association rule. When the multiple look-up tables are established, the above steps S540 to S570 are performed. After confirming that no association rules have been established, step S640 is performed, the look-up table management unit 130 establishes the look-up tables according to preset rules and the prediction unit 150 starts to record the access history of the data storage device 100 or the host H starts to record the access history of the data storage device 400, and continue from the step S570 described above until sufficient previous access commands are collected. The computing device 402 or the prediction unit 150 obtains the association rule according to the previous access command of the access history. The preset rule can be set at the factory or set up sequentially in accordance with the order of the logical block address. The present disclosure provides no limitation to the way in which the preset rule is formulated.

For details of the implementation of steps S540 to S570, please refer to the above description, and no further details will be incorporated here.

In summary, the embodiments of the present disclosure provide a data storage system, a data storage device and a management method of a data storage device. By analyzing the access history of the data storage device, the association rules between previous access locations are obtained, and a look-up table is established and even the subsequent access ranges are further predicted to prepare the required look-up table according to the association rules. In this manner, the data storage device can adaptively prepare the look-up table according to hot data, so that the corresponding hit rate of the look-up table can be improved, and the number of times of re-establishing look-up tables can be reduced, thereby enhancing the accessing performance of the storage device.

What is claimed is:

1. A data storage device comprising:
   a memory array;
   a prediction unit configured to obtain a plurality of association rules between a plurality of access locations according to a plurality of previous access commands; and
   a look-up table management unit configured to manage a plurality of look-up tables according to the plurality of association rules, wherein the look-up table management unit determines whether a current access command corresponds to at least one of the plurality of look-up tables to obtain a physical address of the current access command in the memory array from the corresponding look-up table, and predicts a look-up table corresponding to a subsequent access command according to the plurality of association rules.

2. The data storage device of claim 1, wherein the prediction unit performs a quantization process on the plurality of previous access commands to obtain a plurality of quantization data, and performs an association rules analysis on the plurality of quantization data to obtain the plurality of association rules.

3. The data storage device of claim 2, wherein a logical address range of the memory array is marked and divided into a plurality of segments after the quantization process, and the prediction unit counts access counts of the plurality of previous access command on the plurality of segments, and performs the association rules analysis according to the access counts on the plurality of segments.

4. The data storage device of claim 3, wherein a mapping range of each of the plurality of look-up tables is equal to a logical address range of at least one of the segments.

5. The data storage device of claim 1, wherein when the current access command does not correspond to any of the plurality of look-up tables, the look-up table management unit establishes a look-up table corresponding to the current access command and pre-establishes a look-up table predicted to be corresponding to the subsequent access command according to the plurality of association rules.

6. The data storage device of claim 1, wherein the look-up table management unit establishes the plurality of look-up tables having association with the current access command according to the plurality of association rules.

7. The data storage device of claim 1, wherein the look-up table management unit preferentially removes the look-up table corresponding to a minimum support level or the look-up table having the lowest association with the current access command according to the plurality of association rules.

8. A data storage system comprising:
   a host comprising a computing device, wherein the computing device obtains a plurality of association rules according to a plurality of previous access commands; and
   a data storage device electrically connected to the host and comprising:

an input-output (I/O) interface, wherein the data storage device receives the plurality of association rules and a current access command from the host through the I/O interface;

a memory array; and a look-up table management unit configured to manage a plurality of look-up tables according to the plurality of association rules, wherein the look-up table management unit determines whether the current access command corresponds to at least one of the plurality of look-up tables to obtain a physical address of the current access command in the memory array from the corresponding look-up table, and predicts a look-up table corresponding to a subsequent access command according to the plurality of association rules.

9. The data storage system of claim 8, wherein the computing device performs a quantization process on the plurality of previous access commands to obtain a plurality of quantization data, and performs an association rules analysis on the plurality of quantization data to obtain the plurality of association rules.

10. The data storage system of claim 9, wherein a logical address range of the memory array is marked and divided into a plurality of segments, and the computing device counts access counts of the plurality of previous access command on the plurality segments, and performs the association rules analysis according to the access counts on the plurality of segments.

11. The data storage system of claim 10, wherein a mapping range of each of the plurality of look-up tables is equal to a logical address range of at least one of the segments.

12. The data storage system of claim 8, wherein when the current access command does not correspond to any of the plurality of look-up tables, the look-up table management unit establishes a look-up table corresponding to the current access command and pre-establishes a look-up table predicted to be corresponding to the subsequent access command according to the plurality of association rules.

13. The data storage system of claim 8, wherein the look-up table management unit establishes the plurality of look-up tables having association with the current access command according to the plurality of association rules.

14. The data storage system of claim 8, wherein the look-up table management unit preferentially removes the look-up table corresponding to a minimum support level or the look-up table having the lowest association with the current access command according to the plurality of association rules.

15. A management method of a data storage device comprising:
obtaining a plurality of association rules according to a plurality of previous access commands;
establishing a plurality of look-up tables according to the plurality of association rules;
receiving a current access command, and determining whether the current access command corresponds to at least one of the plurality of look-up tables to obtain a physical address of the current access command from the corresponding look-up table; and
predicting a look-up table corresponding to a subsequent access command according to the plurality of association rules.

16. The management method of claim 15, wherein the steps of obtaining the plurality of association rules according to the plurality of previous access commands comprise:
performing a quantization process on the plurality of previous access commands to obtain a plurality of quantization data, and performing an association rules analysis on the plurality of quantization data to obtain the plurality of associations rules.

17. The management method of claim 16, wherein the step of performing the quantization process on the plurality of previous access commands to obtain the plurality of quantization data, and performing the association rules analysis on the plurality of quantization data to obtain the plurality of associations rules comprises:
marking and dividing a logical address range of a memory array of the data storage device into a plurality of segments;
counting access counts of the plurality of previous access command on the plurality segments; and
performing the association rules analysis according to the access counts on the plurality of segments.

18. The management method of claim 17, wherein a mapping range of each of the plurality of look-up tables is equal to a logical address range of at least one of the segments.

19. The management method of claim 15, wherein the step of determining whether the current access command corresponds to at least one of the plurality of look-up tables comprises:
when the current access command does not correspond to any of the plurality of look-up tables, a look-up table corresponding to the current access command is established and a look-up table predicted to be corresponding to the subsequent access command is pre-established according to the plurality of association rules.

20. The management method of claim 15, further comprising:
preferentially removing the look-up table corresponding to a minimum support level or the look-up table having the lowest association with the current access command according to the plurality of association rules.

21. The management method of claim 15, wherein the step of establishing the plurality of look-up tables according to the plurality of association rules comprises:
determining whether there are the plurality of association rules;
when the plurality of association rules do not exist, the plurality of look-up tables are established according to a preset rule and an access history of the data storage device is recorded until the plurality of association rules are obtained according to the plurality of previous access commands of the access history; and
when the plurality of association rules exist, the plurality of look-up tables having association with the current access command are established according to the plurality of association rules.

22. The management method of claim 21, wherein the step of starting to establish the plurality of look-up tables according to the plurality of association rules comprises:
preferentially establishing a look-up table corresponding to a highest support level as an initial look-up table according to the plurality of association rules, and establishing the other look-up tables having association with the initial look-up table according to the plurality of association rules.

* * * * *